US011772131B2

(12) United States Patent
Süss et al.

(10) Patent No.: US 11,772,131 B2
(45) Date of Patent: Oct. 3, 2023

(54) METHOD FOR SORTING ARTICLES, AND SORTING DEVICE

(71) Applicant: KNAPP AG, Hart bei Graz (AT)

(72) Inventors: Heiko Süss, Hart bei Graz (AT); Bernhard Pürschl, Hart bei Graz (AT); Marc Pendl, Hart bei Graz (AT); Paul Mess, Gronau (DE); Franz Mathi, Hart bei Graz (AT)

(73) Assignee: KNAPP AG, Hart Bei Graz (AT)

( * ) Notice: Subject to any disclaimer, the term of this patent is extended or adjusted under 35 U.S.C. 154(b) by 0 days.

(21) Appl. No.: 17/995,179

(22) PCT Filed: Mar. 11, 2021

(86) PCT No.: PCT/AT2021/060086
§ 371 (c)(1),
(2) Date: Sep. 30, 2022

(87) PCT Pub. No.: WO2021/195679
PCT Pub. Date: Oct. 7, 2021

(65) Prior Publication Data
US 2023/0139511 A1    May 4, 2023

(30) Foreign Application Priority Data

Mar. 31, 2020    (AT) .............................. A 50261/2020

(51) Int. Cl.
*B07C 1/10*       (2006.01)
*B07C 3/06*       (2006.01)
*B07C 3/08*       (2006.01)
*B07C 5/34*       (2006.01)
*B65G 47/46*      (2006.01)

(52) U.S. Cl.
CPC .................. *B07C 1/10* (2013.01); *B07C 3/06* (2013.01); *B07C 3/082* (2013.01); *B07C 5/34* (2013.01);
(Continued)

(58) Field of Classification Search
CPC .. B07C 1/10; B07C 3/06; B07C 3/082; B07C 5/34; B65G 47/46; B65G 47/2203; B65G 47/0208
See application file for complete search history.

(56) References Cited

U.S. PATENT DOCUMENTS 5,086,929 A *    2/1992  Richter ................... B07C 3/082
                                                            198/370.04
5,217,105 A      6/1993  Sapp et al.
(Continued)

FOREIGN PATENT DOCUMENTS

CN    110155680 A    8/2019
DE    19959843 A1    6/2001
(Continued)

OTHER PUBLICATIONS

International Search Report, dated Jun. 11, 2021, from PCT/AT2021/060086.

*Primary Examiner* — Michael McCullough
*Assistant Examiner* — Kalyanavenkateshware Kumar
(74) *Attorney, Agent, or Firm* — Workman Nydegger (57) ABSTRACT

A sorting device and a method for sorting articles at delivery points are shown, the sorting device having a conveying device comprising transport platforms that are movable along a transport direction for transporting the articles and for delivering the articles to the delivery points, with the transport platforms having a bearing surface for the articles and with at least one transport platform having a first delivery device for vertically delivering the articles from the bearing surface to at least one first delivery point. To provide a sorting device for reliable and careful joint sorting of articles with different transport and delivery requirements, at least one transport platform has a second delivery device for
(Continued)

laterally delivering the articles from the bearing surface to at least one second delivery point.

15 Claims, 4 Drawing Sheets

(52) U.S. Cl.
CPC ...... *B65G 47/46* (2013.01); *B65G 2203/0208* (2013.01)

(56) References Cited

U.S. PATENT DOCUMENTS

| | | | |
|---|---|---|---|
| 6,762,382 | B1 | 7/2004 | Danelski |
| 9,020,634 | B2 * | 4/2015 | Bailey ................... B65G 15/00 209/584 |
| 2006/0060447 | A1 | 3/2006 | Ramaker et al. |
| 2010/0320062 | A1 * | 12/2010 | Van Den Goor .... B65G 47/844 198/890.1 |
| 2016/0325315 | A1 | 11/2016 | Zimmer et al. |

FOREIGN PATENT DOCUMENTS

| | | |
|---|---|---|
| DE | 102014119110 A1 | 6/2016 |
| EP | 1505015 A1 | 2/2005 |
| EP | 2159174 A1 | 3/2010 |
| EP | 2389330 A1 | 11/2011 |
| WO | 2015174843 A1 | 11/2015 |
| WO | 201656911 A2 | 4/2016 |

* cited by examiner

METHOD FOR SORTING ARTICLES, AND SORTING DEVICE

The invention relates to a sorting device for sorting articles at delivery points according to the preamble of claim 1.

Furthermore, the invention relates to a method of sorting articles at specific respective delivery points with such a sorting device.

STATE OF THE ART

Conventional sorting technologies have been established on the market for many years, such as, for example, transverse-belt, push/shoe or split sorters for flat goods or also hanging goods sorters. Depending on the nature of the articles to be sorted (size, weight, etc.), there are suitable solutions so as to meet the respective market requirements.

Due to the requirements which are currently changing—different articles such as letters, packages, trays, loose goods, etc. within a flow of goods, as is necessary in e-commerce business, it is no longer possible to optimally sort the entire range of articles with a classical solution.

Heavy and/or large articles must be sorted, for example, with a technology in which they are expelled horizontally or, respectively, laterally, as it is rendered possible by transverse-belt or shoe sorters. In case of light-weight and/or small articles, however, bag or split-tray sorting, in which the delivery can take place vertically/in a falling fashion, is more reasonable.

From the prior art (U.S. Pat. No. 5,217,105 A), for example, a sorting device is known in which articles are moved from a main conveyor device to a secondary conveyor device by means of push elements. In doing so, the articles are moved via sliding elements, which are displaceable in the direction of the second conveyor section.

Likewise, "push sorters" expelling horizontally or, respectively, laterally (EP 2 159 174 A1, US 2016/0325315 A1) and "shoe sorters" (US 2006/0060447 A1) are known from the prior art.

So-called "split-tray sorters", which allow a vertical (falling) delivery of articles, are known from CN 110155680 A, for example.

In addition, sorting devices according to the preamble of claim 1 are known from the prior art (U.S. Pat. No. 6,762,382 B, DE 10 2014 119 110 A1), which are designed for the vertical delivery of articles from a transport platform to a delivery point located underneath.

Furthermore, sorting devices are known from the prior art (DE 199 59 843 A1, WO 2016/056911 A2, WO 2015/174843 A1) which are designed for the lateral delivery of articles by expelling them from a transport platform by means of a slider.

EP 1 505 015 A1 discloses a sorting device for products which are transported in a transport direction, the sorting device comprising a conveying device having an endless conveying path.

EP 2 389 330 A1 discloses a conveying system for conveying packaging trays for food products from one or several import stations to one or several export stations.

A disadvantage of those known sorting devices and, respectively, methods is that they are each designed for the fastest possible sorting to specific end points with maximum throughput for a specific range of articles. However, such sorting devices can deal with varying ranges of articles only to a very limited extent, or are not at all suitable for sorting certain articles. Thus, they cannot simultaneously deliver heavy and light-weight or large and small articles in a manner that is gentle on the articles, for which purpose several sorting devices usually have to be provided for sorting a wide range of articles, which causes high costs.

DISCLOSURE OF THE INVENTION

It is therefore the object of the present invention to provide a sorting device of the initially mentioned kind which overcomes the disadvantages of the prior art and ensures reliable and careful joint sorting of articles with different transport and delivery requirements.

The invention achieves the object of the invention that is posed with regard to the sorting device by providing a sorting device having the features of claim 1.

If at least one transport platform of the sorting device has a second delivery device for laterally delivering the articles from the bearing surface to at least one second delivery point, in addition to the vertical falling movement performed by the first delivery device for delivering the articles to the first delivery point, a second delivery device can be provided which enables gentle sorting of the articles without a falling movement. This can be advantageous, for example, when sorting fragile, very heavy or very bulky articles, which either must not be thrown or would constitute a high load on the mechanical components of the sorting device. However, it is not necessary to dispense with the inexpensive and fast vertical delivery devices because of the sorting device according to the invention. Rather, they can be used in parallel next to laterally outputting delivery devices, thus enabling a particularly cost-effective sorting device for reliable and careful joint sorting of a variety of articles.

"Articles" within the meaning of the present invention are understood to mean both individual articles as well as exterior packagings and loading aids with several individual articles. In this connection, individual articles can be, for example, letters, parcels, products, etc., while exterior packagings are containers, e.g., cartons, crates, etc., for accommodating several such individual articles. Loading aids can also be containers for several individual articles that have additional functions such as, for example, tipping trays, sorting trays and the like.

In the context of the present invention, "lateral" is always understood to mean those directions which, at the respective point of the conveying device, are transverse to the transport direction thereof and essentially orthogonal to the vertical direction.

The first delivery device can have a structurally simple design if it is designed as a drop flap with at least one flap that can be rotated about a horizontal axis for vertically ejecting the articles to the delivery point. In this case, the one or several flaps can be pivotable reversibly from a closed position into an open position and, in the closed position, can form the bearing surface of the transport platform.

In this case, the drop flap can be formed by any desired arrangement of rotatable flaps. The axes of rotation of the flaps are preferably mounted at the edges of the transport platforms.

In one embodiment variant, the drop flap can be formed by a flap mounted at the edge of the transport platform and forming the bearing surface.

In a further embodiment variant, however, the drop flap can have two flaps mounted at respective opposite edges of the transport platform, with the flaps, in the closed state, converging in the middle of the transport platform, jointly forming the bearing surface.

Similarly, in a further embodiment variant, the drop flap can be formed from several flaps arranged next to each other and mounted at the edges of the transport platform, the flaps being pivotable independently of one another for ejecting the articles vertically.

In this case, the drop flap can have, for example, a pneumatically releasable mechanical lock. In a further embodiment variant, the drop flap can also have an electrically, magnetically or mechanically releasable lock. By releasing the lock, the flaps can be pivoted into the open position automatically, for example due to gravity, thus ejecting the article lying on the bearing surface vertically through the drop flap.

For a particularly gentle delivery of articles, the second delivery device can be designed as a slider for laterally expelling the articles to the second delivery point.

If the slider has a sliding element which is displaceable between a rest position and an expulsion position along the bearing surface transversely to the transport direction, the articles can be reliably delivered to the second delivery point in a technically simple manner by displacing the sliding element.

In this case, the sliding element can be displaced from a rest position, in which the articles rest on the bearing surface of the transport platform and are transported, into an ejection position, in which the articles are expelled from the bearing surface by the sliding element transversely to the transport direction.

In one embodiment variant of the invention, the rest position of the sliding element can be arranged at an edge of the transport platform or the bearing surface, respectively, so that the articles lying on the bearing surface are expelled to the respective other side of the transport platform.

If the sliding element in its rest position forms a separating web on the bearing surface, the bearing surface of the transport device can be divided in a technically simple manner into a first and a second bearing area on each side of the separating web. Parallel transport of several articles in separate bearing areas on the transport platform is thereby enabled.

In this case, the rest position of the sliding element and thus the separating web can be arranged in the middle of the transport platform or, respectively, the bearing surface or can also be arranged outside of the middle, e.g., ⅓ to ⅔ or ¼ to ¾. The sliding element can thus have an ejection position on each of the two opposite edges of the transport platform transversely to the transport direction. Articles can thereby rest on the bearing surface on either side of the separating web in the respective first or second bearing area, and the sliding element can be displaced so as to expel the articles from the first or second bearing area to the respective ejection position.

In a further embodiment variant, a separating web can be provided on the bearing surface, which divides the bearing surface into a first and a second bearing area on each side of the separating web. In this case, a slider and a drop flap can, in each case, be provided on both sides of the separating web, which can be actuated in particular independently of one another. In a further variant, a slider can also be provided only in the first bearing area, and only one drop flap can be provided in the second bearing area.

In yet another variant, the bearing surface can be divided into a first and a second bearing area also without a separating web as described above.

A technically simple sorting device can be created if the sliding element is coupled to at least one traction means provided at an edge of the transport platform for displacement along the bearing surface.

In this case, the sliding element can preferably be coupled to two traction means provided at opposite edges of the transport platform and driven in parallel for displacement along the bearing surface. Furthermore, the traction means can, in this case, preferably be arranged at the edges of the transport platform which are located in the transport direction of the conveying device so that it becomes possible to displace the sliding element transversely to the transport direction.

In a preferred embodiment variant of the invention, the traction means is arranged underneath the transport platform so that the bearing surfaces are arranged level with one another, in particular without elevations, in the conveying device of adjacent transport platforms. In this way, it becomes possible to transport oversized articles that extend across several adjacent transport platforms. The articles can thereby be delivered horizontally to a delivery point by simultaneously displacing several sliding elements into their ejection positions.

The traction means is preferably designed in a structurally simple manner as a driven belt or a driven chain. Such a belt or, respectively, such a chain can be driven, for example, by a motor, by a friction wheel drive or by comparable drive devices in order to displace the sliding element.

In a further embodiment variant of the invention, the sliding element is coupled to at least one spindle provided at an edge of the transport platform for displacement along the bearing surface. Such a spindle can, for example, be part of a ball screw drive, a roller screw drive, a planetary roller screw drive, a trapezoidal screw drive, a high-helix screw drive or the like, with the spindle being designed appropriately.

In further embodiment variants of the invention, the sliding element can have alternative linear drives, such as, for example, linear motors, pneumatic cylinders, hydraulic cylinders, rack-and-pinion drives, etc., for displacement along the bearing surface.

In a further embodiment variant, the second delivery device can be designed as a tipping tray for laterally delivering the articles to the second delivery point.

In a variant, the tipping tray can be designed, for example, as a tiltable drop flap in the transport platform. In a further variant, the tipping tray can be provided on the transport platform in such a way that it can be delivered independently.

According to the invention, the sorting device comprises at least one transport platform of a first type, with the transport platform of the first type having, at the same time, the first delivery device for vertically delivering the articles and the second delivery device for laterally delivering the articles. A particularly versatile and cost-efficient sorting device can thus be provided. According to the invention, such a "combined" transport platform of the first type enables articles of different properties (size, weight, fragility, etc.) to be sorted at the same time. For example, small, robust articles and large, bulky or, respectively, fragile articles can be transported with the sorting device according to the invention on transport platforms of the first type and can be delivered either vertically or laterally to delivery devices in each case depending on the properties of the articles.

If the sorting device comprises at least one transport platform of a second type and at least one transport platform of a third type, with the transport platform of the second type having only the first delivery device for vertically delivering the articles and the transport platform of the third type having only the second delivery device for laterally delivering the articles, a particularly inexpensive and technically simple sorting device can thus be created. In this case, the transport platforms of the second type and the third type can, for example, alternate in the conveying device, which in turn means that articles of different properties (as described above) can be placed on the respective transport platform in order to be delivered to delivery devices optionally vertically or laterally.

In the sorting device according to the invention, the conveying device can have a closed chain of transport containers which are adjacent to one another and are guided along an essentially circular path. Such an essentially circular path can be an oval path, for example, which consists of straight sections connected with curves.

In one embodiment of the invention, this can be a closed chain of transport platforms of the first type that are adjacent to one another.

In a further embodiment variant of the invention, this can be a closed chain of transport platforms that are adjacent to one another, in which transport platforms of the first and/or second and/or third type alternate.

The delivery points of the sorting device, into which the articles are delivered vertically or laterally by the delivery devices, can have downstream secondary conveying devices in order to supply the articles to end points. In this case, the secondary conveying devices can be conveyor chutes or conveyor belts, for example. The containers to which the articles are supplied can be rigid containers, such as crates, boxes, baskets or the like, or flexible containers, such as sacks, bags, etc.

In one embodiment variant, the first and second delivery points can be connected to the same end point by secondary conveying devices so that articles of different categories are output to the delivery points appropriately by means of the first or second delivery device, but are brought together at one end point. In this way, for example, light-weight and robust articles can be dropped vertically directly into a crate via the first delivery device, and heavy or fragile articles can slide laterally across a conveyor chute into this crate via the second delivery device in order to sort these different types of articles into this crate.

It is a further object of the invention to improve a method of the initially mentioned kind such that articles of different categories can be sorted reliably and carefully.

The invention achieves the object that is posed with regard to the method by providing a method having the features of claim 11.

If the articles are assigned a parameter characterizing them and if the articles are delivered to the respective delivery point optionally laterally or vertically in each case depending on the parameter, an inexpensive sorting method can be created which allows articles of different categories and properties to be sorted reliably. Thus, the articles can be distinguished by parameters characterizing them and can be treated differently according to the parameter. In particular, depending on the parameter, a decision is thereby made as to whether the article is delivered laterally or vertically to the respective delivery point.

While vertical delivery enables faster and more efficient sorting of the articles, but should be limited to small, light-weight or, respectively, uncritical articles, lateral delivery can process a larger range of articles more gently. It can thus be avoided that the entire sorting has to be carried out by the slower and technically more complex lateral delivery, or that separate sorting devices have to be provided for the different categories of articles.

According to the invention, the articles can be placed on transport platforms of a first type for an optionally lateral or vertical delivery from the respective transport platform to the respective delivery point. A particularly efficient method can be created in this way, since the articles can be delivered optionally laterally or vertically through each transport platform of the first type, depending on the parameter. An article is thus initially placed on any transport platform of the first type and can later then be delivered laterally or vertically, depending on the parameter.

In a further embodiment variant of the method, the articles can be placed on transport platforms of a second type for vertical delivery or on transport platforms of a third type for laterally delivering the articles to the respective delivery point, in each case depending on the parameter. For example, the transport platforms of the second and third types can be provided alternately in the conveying device. Depending on the parameter, an article is then either placed on a transport platform of the second type and thus later delivered vertically to the delivery point, or is placed on a transport platform of the third type and thus later delivered laterally to the delivery point.

The lateral delivery of the articles from transport platforms of the first or third type can preferably be effected in that they are pushed out by means of a slider. The vertical delivery of the articles from transport platforms of the first or second type can in turn preferably be effected in that they are thrown from the transport platforms through a drop flap.

The at least one parameter characterizing the respective articles and associated to them can preferably be the fragility, the size, the shape and/or the weight of the article. In particular, the vertical delivery or, respectively, throwing of fragile, very large or very heavy articles can be very detrimental to the articles or can lead to increased wear of the mechanical components of the sorting device.

BRIEF DESCRIPTION OF THE FIGURES

In the following, preferred embodiment variants of the invention are illustrated in further detail with reference to the figures.

WAYS OF IMPLEMENTING THE INVENTION

Figure 1:
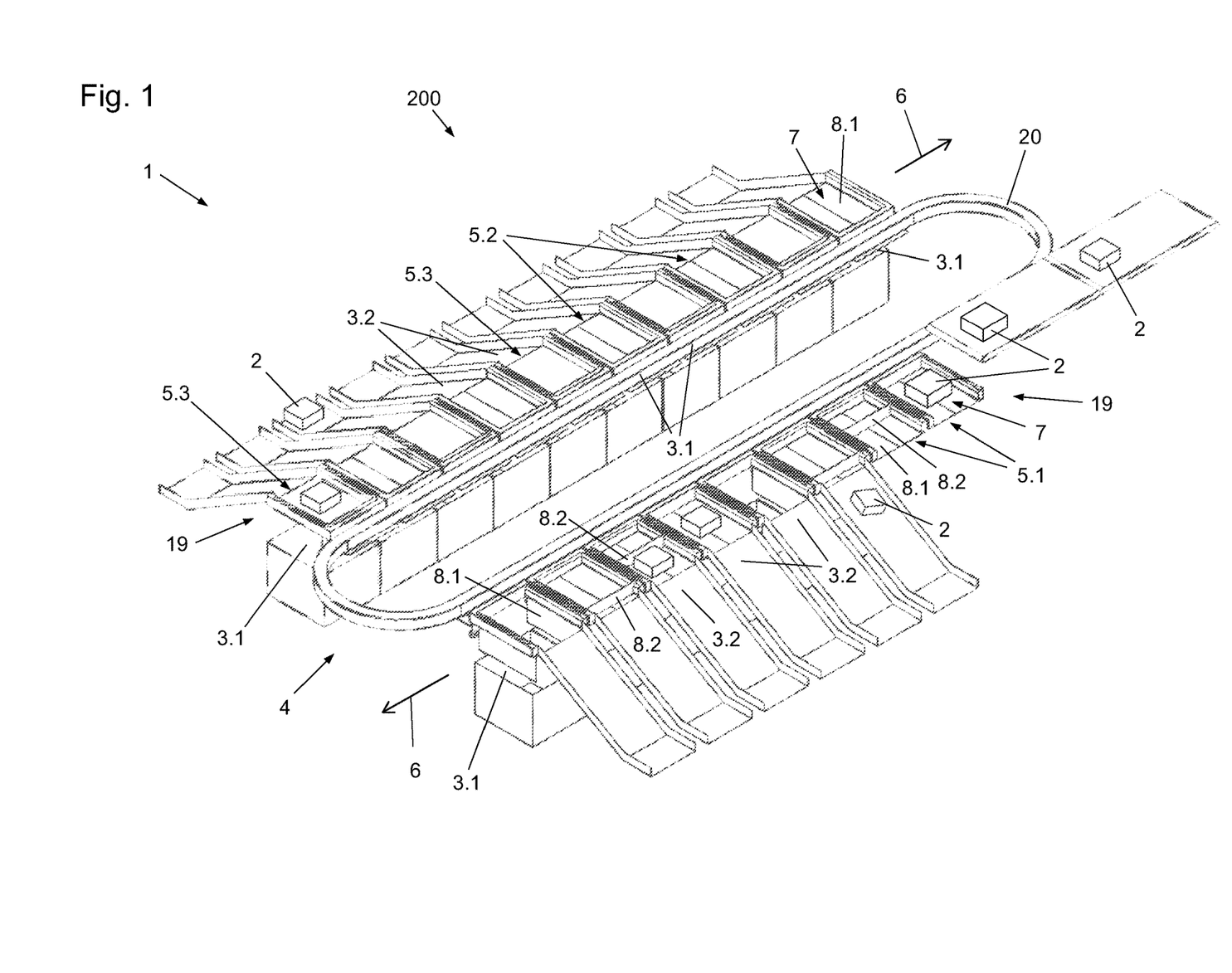
FIG. 1 shows a schematic view of the sorting device and the sorting method according to a first embodiment variant.

FIG. 1 shows a sorting device 1 according to a first embodiment variant of the invention for sorting articles 2 to different delivery points 3.1, 3.2. For this purpose, the sorting device 1 has a conveying device 4 with transport platforms 5.1, 5.2, 5.3, the transport platforms 5.1, 5.2, 5.3 being movable on the conveying device 4 along the transport direction 6. The transport platforms 5.1, 5.2, 5.3 are designed for transporting and delivering the articles 2 to the delivery points 3.1, 3.2. For this purpose, the transport platforms 5.1, 5.2, 5.3 have bearing surfaces 7 for the articles 2 on which the articles 2 lie during transport to the delivery points 3.1, 3.2.

According to the invention, at least one of the transport platforms 5.1, 5.2 has a first delivery device 8.1 which is designed for delivering the articles 2 vertically from the respective bearing surface 7 of the transport platform 5.1, 5.2 to a first delivery point 3.1.

In addition, at least one of the transport platforms 5.1, 5.3 has a second delivery device 8.2 which is designed for delivering the articles 2 laterally from the respective bearing surface 7 of the transport platform 5.1, 5.3 to a second delivery point 3.2.

Furthermore, the first and second delivery points 3.1, 3.2 can also be connected to end points via secondary conveying devices, such as conveyor chutes, conveyor belts or the like, wherein the first and second delivery points 3.1, 3.2 can also be connected to the same respective end point. This was only implied in the figures by the conveyor chutes connected to the second delivery points 3.2 and the end points arranged under the first delivery points 3.1.

In the embodiment variant shown in FIG. 1, transport platforms 5.1 of a first type are provided in the sorting device 1, which have both the first delivery device 8.1 and the second delivery device 8.2. Furthermore, transport platforms 5.2 of a second type and transport platforms 5.3 of a third type are also provided, the transport platforms 5.2 of the second type only having the first delivery device 8.1 and the transport platforms 5.3 of the third type only having the second delivery device 8.2.

In a further embodiment variant, which is not illustrated any further in the figures, the sorting device 1 exclusively has transport platforms 5.1 of the first type.

In yet another embodiment variant, which is not illustrated in the figures, the sorting device 1 exclusively has transport platforms 5.2 of the second type and transport platforms 5.3 of the third type.

Figure 3:
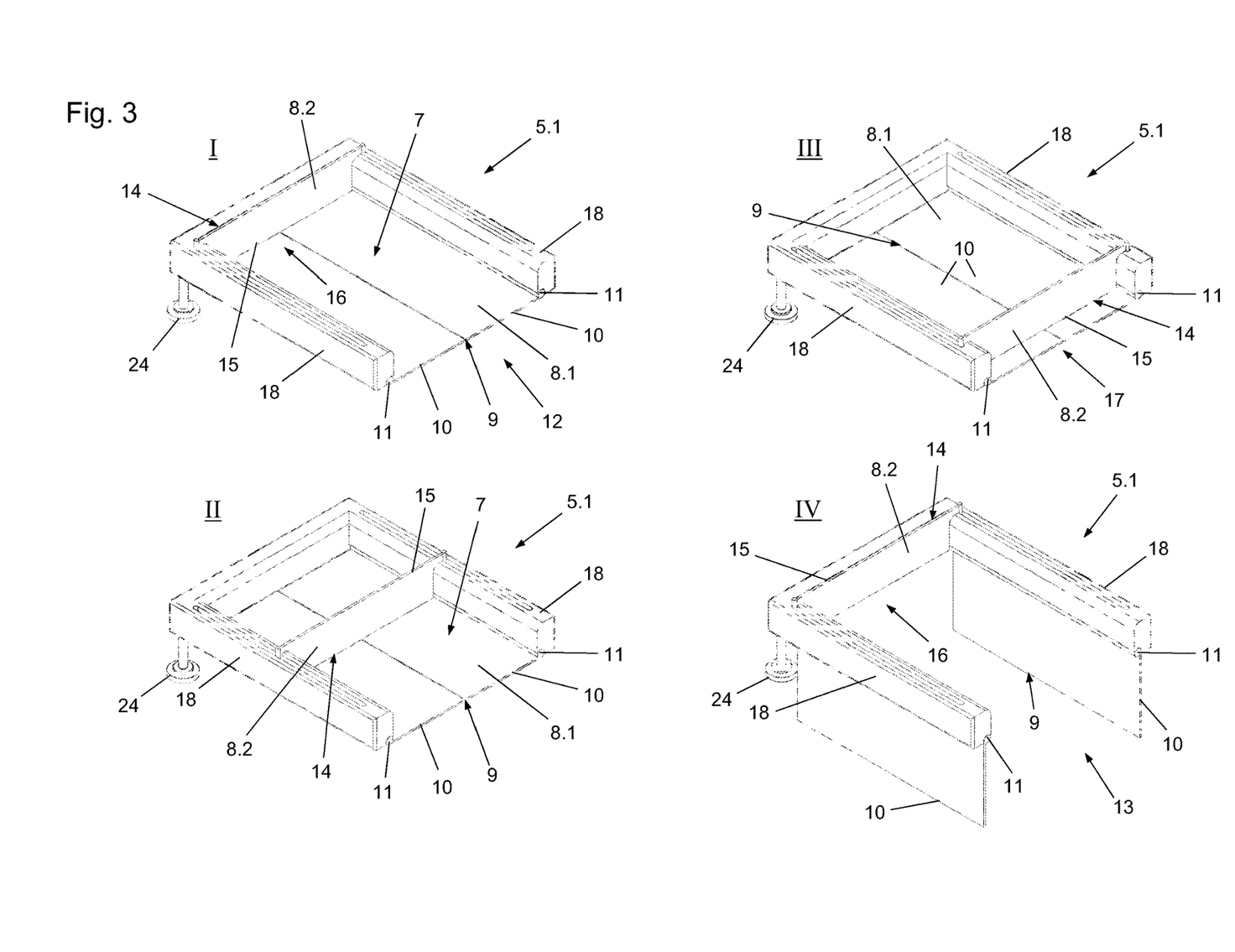
FIG. 3 shows schematic views of a transport platform according to the first embodiment variant of the sorting device.

In FIG. 3, a schematic detailed view of a transport platform 5.1 of the first type is shown, which has both the first delivery device 8.1 and the second delivery device 8.2.

In the embodiment variant shown in FIG. 3, the first delivery device 8.1 is designed as a drop flap 9 with two flaps 10, each rotatable about horizontal axes 11, for vertically ejecting the articles 2 to a first delivery point 3.1 located underneath. In this case, the flaps 10 can be pivoted reversibly from a closed position 12 into an open position 13. In the closed position 12, the flaps 10 form the bearing surface 7 of the transport platform 5.1.

In the embodiment variant shown in FIG. 3, the second delivery device 8.2 is designed as a slider 14 for laterally expelling the articles 2 to a second delivery point 3.2 arranged laterally with respect to the conveying device 4. The slider 14 has a sliding element 15 which can be displaced between a rest position 16 and an expulsion position 17 along the bearing surface 7 transversely to the transport direction 6. For this purpose, the sliding element is coupled to two traction means provided at opposite edges 18 of the transport platform 5.1 and driven in parallel, which, however, has not been shown in more detail in the figures.

In the present embodiment variant, the traction means are belts, which are driven by a drive means 24, for example a friction wheel or a motor.

FIG. 3 shows the transport platform 5.1 in four different states I, II, III and IV.

In state I, the transport platform 5.1 is ready to receive articles 2 and to transport them to a delivery point 3.1, 3.2. In this case, the drop flap 9 is in the closed position 12, which means that the flaps 10 form the bearing surface 7. The slider 14 is not actuated and the sliding element 15 is in its rest position 16.

In state II, the slider 14 of the transport platform 5.1 is actuated as the second delivery device 8.2 in order to expel the article 2 (not shown) located on the bearing surface 7 laterally to a second delivery point 3.2. In this case, the sliding element 15 is in a middle position in order to grasp the article 2 and expel it along the bearing surface 7.

In state III, the slider 14 has been fully actuated and the article 2 has been expelled laterally from the bearing surface 7 to the second delivery point 3.2. For this purpose, the sliding element 15 is therefore in the expulsion position 17.

In state IV, the slider 14 with the sliding element 15 is in the rest position 16, but the drop flap 9 has been actuated as the first delivery device 8.1 in order to eject the article 2 located on the bearing surface 7 vertically to a first delivery point 3.1. For this purpose, the flaps 10 of the drop flap 9 have been pivoted into their open position 13, as a result of which the article 2 can be delivered vertically downwards.

The transport platforms 5.1 are also depicted in FIG. 1 in the sorting device 1 according to the states I, II, III and IV as illustrated in FIG. 3.

In accordance with the embodiment variant in FIG. 1, the conveying device 4 of the sorting device 1 is designed as a chain 19 of transport platforms 5.1, 5.2, 5.3 which are adjacent to one another and are guided along an essentially circular path 20.

In a further embodiment variant, the circular path 20 can, in this case, be guided in a horizontal and vertical plane so that the transport platforms 5.1, 5.2, 5.3 are guided back vertically above or below the transport platforms 5.1, 5.2, 5.3 in the opposite direction to the transport direction 6.

In a further embodiment variant, the conveying device can also be designed as a closed chain 19 of transport platforms 5.1, 5.2, 5.3 that are adjacent to one another, which, however, has not been shown in more detail in the figures.

According to FIG. 1, a method 200 of sorting articles 2 is shown, too. In this process, the articles 2 are placed on the transport platforms 5.1, 5.2, 5.3 of the conveying device 4 and are transported on the transport platforms 5.1, 5.2, 5.3 by means of the conveying device 4 to specific respective delivery points 3.1, 3.2 and are delivered to them.

In this case, the articles 2 are each assigned a parameter characterizing them. Such a parameter can, for example, be the fragility, the size and/or the weight of the article 2. According to the invention, the articles 2 are then delivered to the respective delivery point 3.1, 3.2 either vertically via the first delivery device 8.1 or laterally via the second delivery device 8.2, in each case depending on the parameter.

As illustrated in FIG. 1, the articles 2 can be placed on transport platforms 5.1 of the first type for this purpose. Since the transport platforms 5.1 of the first type have both a first delivery device 8.1 and a second delivery device 8.2, the articles 2 can simply be delivered vertically or laterally after they have been transported to the specific delivery point 3.1, 3.2, depending on their parameter.

Furthermore, the articles 2 can also optionally be placed on transport platforms 5.2 of the second type or transport platforms 5.3 of the third type when they are placed on the transport platforms 5.1, 5.2, 5.3, depending on their parameter. For example, an article 2, which has to be delivered vertically because of its parameter that has been associated to it, can be placed on a transport platform 5.2 of the second type, which has a first delivery device 8.1 for vertical delivery. On the other hand, articles 2 which have to be delivered laterally because they are heavy or fragile, for example, can already be placed on a transport platform 5.3 of the third type, which has a second delivery device 8.2 for a lateral output. According to the embodiment variant shown in FIG. 1, the first delivery device 8.1 for vertical delivery is designed as a drop flap, and the second delivery device 8.2 for lateral delivery is designed as a slider.

Figure 2:
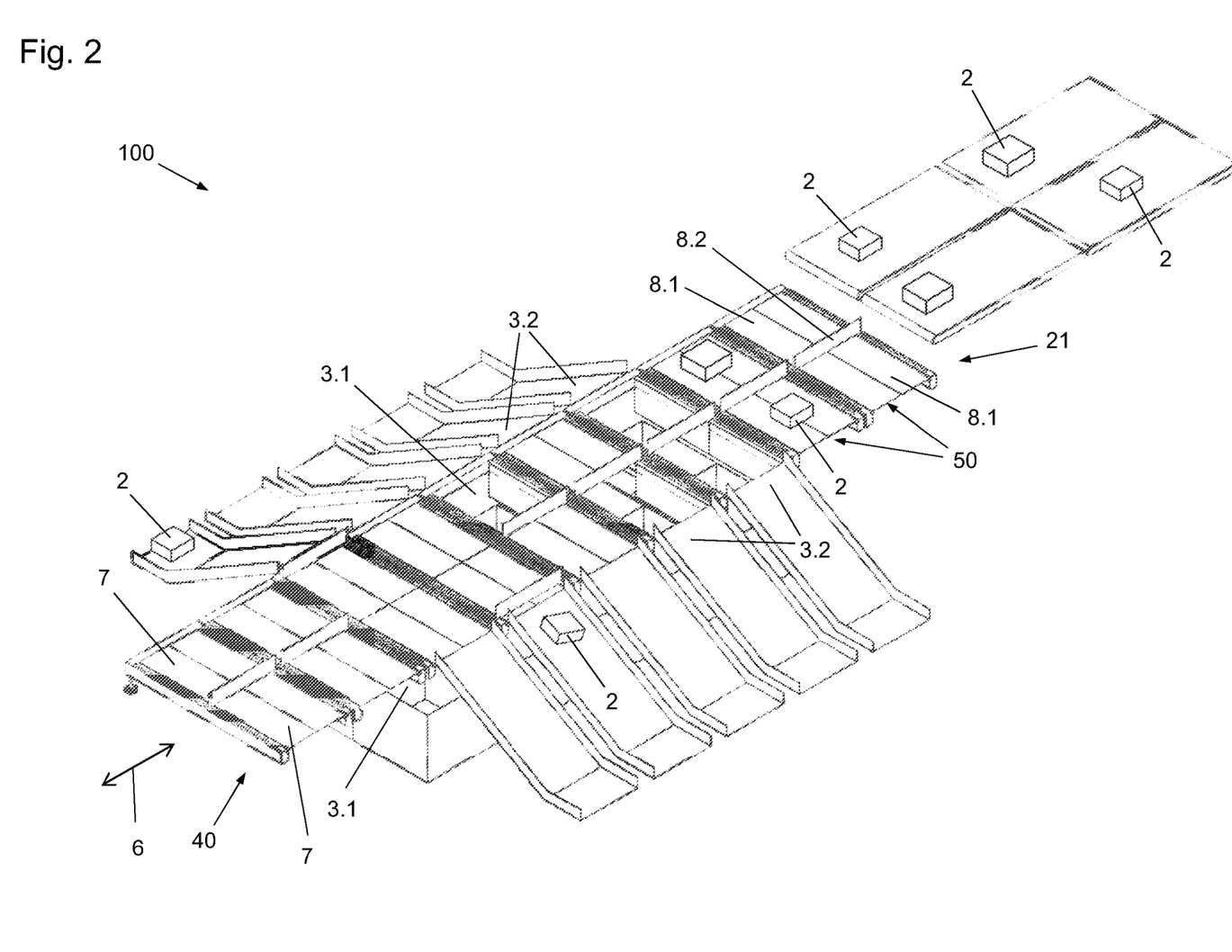
FIG. 2 shows a schematic view of the sorting device and the sorting method according to a second embodiment variant.

FIG. 2 shows a further embodiment variant of the sorting device 100 according to the invention, wherein the conveying device 40 is designed as a linear chain 21 of transport platforms 50 of the first type that are adjacent to one another. In the embodiment variant shown in FIG. 2, the linear chain 21 is moved along the transport direction 6 by a back-and-forth movement in order to transport the articles 2 to the corresponding delivery points 3.1, 3.2.

In a further embodiment variant, which is not shown in the figures, the conveying device 40 can also be designed as a closed chain, with the transport platforms 50 being guided along a path in a horizontal and vertical plane so that the transport platforms 50 are guided back vertically above or below the transport platforms 50 in the opposite direction to the transport direction 6.

As shown for the embodiment variant in FIG. 1, the transport platforms 50 are designed for transporting and delivering the articles 2 to the first and second delivery points 3.1, 3.2, with the articles 2 in turn resting on the bearing surfaces 7 of the transport platforms 50 during the transport to the delivery points 3.1, 3.2.

The transport platforms 50 of the first type have two first delivery devices 8.1 for delivering the articles 2 vertically to the first delivery points 3.1, and a second delivery device 8.2 for delivering the articles 2 laterally to the second delivery points 3.2. Articles 2 can be placed on the transport platforms 50 both in a first bearing area 23.1 and in a second bearing area 23.2. The articles 2 from the bearing areas 23.1, 23.2 can then be delivered vertically into a first delivery point 3.1 or laterally into a second delivery point 3.2, in each case independently of one another.

Figure 4:
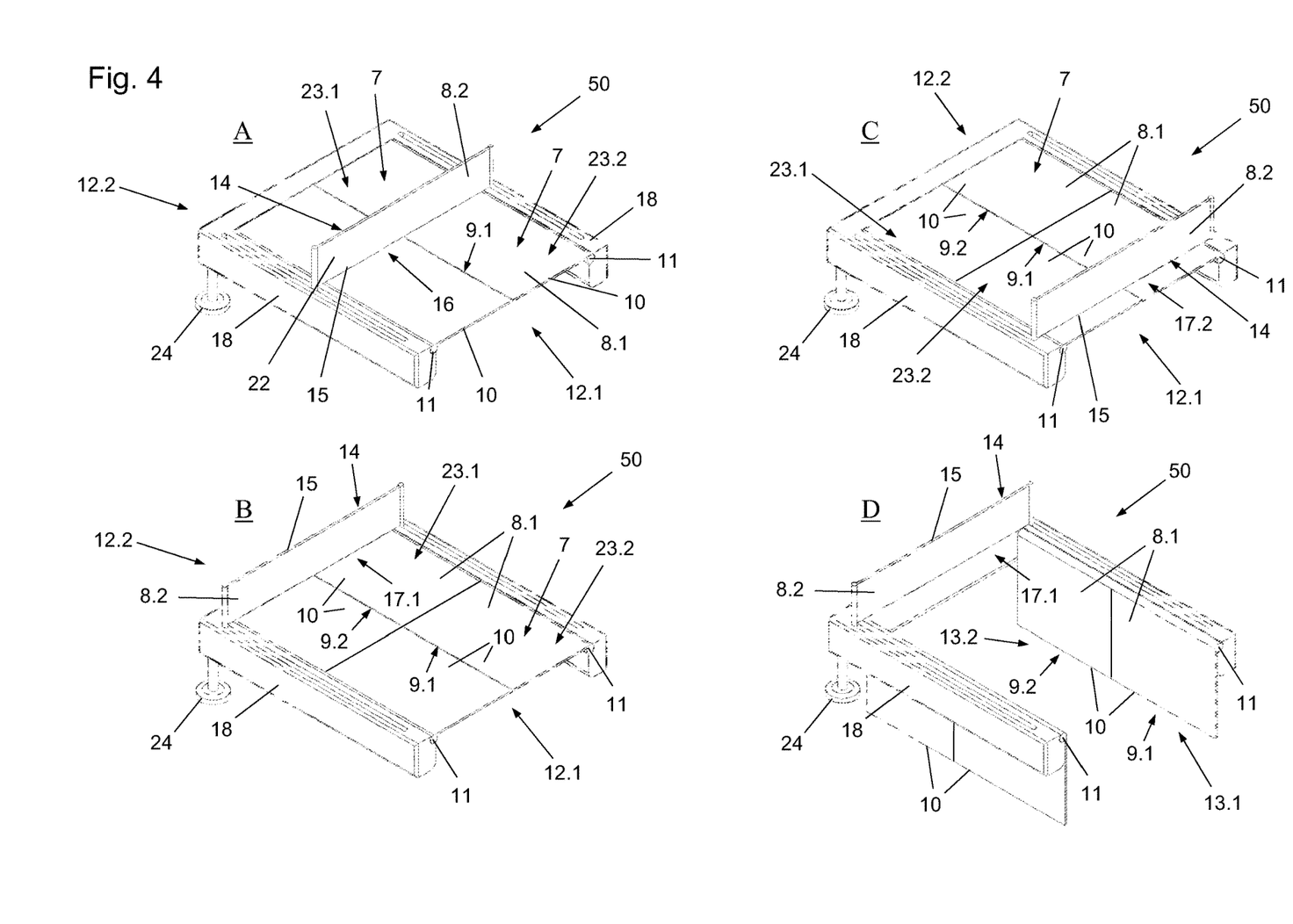
FIG. 4 shows schematic views of a transport platform according to the second embodiment variant of the sorting device.

FIG. 4 shows a schematic detailed view of the transport platform 50 according to the embodiment variant in FIG. 2 in four different states A, B, C and D.

In contrast to the transport platforms 5.1 shown in FIGS. 1 and 3, the transport platform 50 has a slider 14 with a sliding element 15 as the second delivery device 8.2, with the sliding element 15 forming in its rest position 16 a separating web 22 on the bearing surface 7, which separating web divides said bearing surface into the first and the second bearing area 23.1, 23.2 on each side of the separating web 22. Articles 2 can thus rest on both sides of the separating web 22 in the first and in the second bearing area 23.1, 23.2 for being transported. The articles 2 from the first and the second bearing area 23.1, 23.2 can then, in each case, be pushed out laterally to one side of the transport platform 50 independently of one another by shifting the sliding element 15 into one of the expulsion positions 17.1, 17.2, as is also illustrated in FIG. 2.

In contrast to the transport platforms 5.1 in FIG. 2, the traction means for driving the sliding element 15 in the present embodiment variant is arranged below the bearing surface 7 at two opposite edges 18 of the transport platform 50. In this way, a flat bearing surface 7, which is not delimited by the edges 18, is created, as a result of which very large articles 2 can be placed across several transport platforms 50, for example.

In addition, the transport platform 50 has two independent drop flaps 9.1, 9.2 as the first delivery devices 8.1. The two drop flaps 9.1, 9.2 each have two flaps 10, which, in turn, are rotatable about horizontal axes 11. The articles 2 can thereby be dropped also vertically from the first and second bearing areas 23.1, 23.2 to the delivery points 3.1. For this purpose, the flaps 10 of the drop flaps 9.1, 9.2 can be pivoted independently of one another from closed positions 12.1, 12.2 into open positions 13.1, 13.2.

State A shows the transport platform 50 as it is ready to transport articles 2 on both sides of the separating web 22 in the bearing areas 23.1, 23.2.

State B shows the transport platform 50 with the slider 14 shifted into the first expulsion position 17.1 in order to expel articles 2 laterally from the first bearing area 23.1 to a second delivery point 3.2. The drop flaps 9.1, 9.2 are each in their closed position 12.1, 12.2.

State C, in turn, shows the transport platform 50 with the slider 14 shifted into the second expulsion position 17.2 in order to expel articles 2 laterally from the second bearing area 23.2 to a second delivery point 3.2. The drop flaps 9.1, 9.2 are again also in their closed positions 12.1, 12.2.

Finally, state D shows the transport platform 50 with the slider 14 shifted into its first expulsion position 17.1 and both drop flaps 9.1, 9.2 pivoted into their open positions 13.1, 13.2 in order to vertically eject articles 2 from the first and second bearing areas 23.1, 23.2 to the first delivery points 3.1. Since the two drop flaps 9.1 and 9.2 can be opened or closed independently of one another, only one drop flap 9.1 or 9.2 can also be opened at a time and the respective other drop flap 9.2 or 9.1 can be closed. In this state, it is advantageous if the slider 14 is positioned in its central rest position in order to prevent an article 2 placed on the closed drop flap 9.2 or 9.1 from slipping sideways and accidentally falling through the open drop flap 9.1 or 9.2.

With regard to the further configuration and features of the transport platform 50, reference is made to the above description of the transport platform 5.1 according to FIG. 2.

In a further embodiment variant, the transport platform according to FIG. 3 or 4 can have only one flap 10, which, however, is not shown in further detail in the figures.

In yet another embodiment variant, a transport platform according to FIG. 3 or 4 can have a separating web on the bearing surface, which divides the bearing surface into a first and a second bearing area on each side of the separating web, which is not illustrated any further in the figures. In this case, a slider, a drop flap or both can be provided in each bearing area, for example.

In yet another embodiment variant, the above-described division of the bearing surface into a first and a second bearing area can also occur without a separating web being provided.

The method 200 according to the invention as illustrated with reference to FIG. 1 can also be performed similarly by means of a device 100 according to FIG. 2. In this regard, reference is made to the above statements on the method 200 according to FIG. 1.

The invention claimed is:

1. A sorting device for sorting articles at delivery points, the sorting device having a conveying device comprising transport platforms that are movable along a transport direction for transporting the articles and for delivering the articles to the delivery points, with the transport platforms having a bearing surface for the articles and with at least one transport platform having a first delivery device for vertically delivering the articles from the bearing surface to at least one first delivery point and at least one transport platform having a second delivery device for laterally delivering the articles from the bearing surface to at least one second delivery point, wherein at least one transport platform of a first type has, at the same time, the first delivery device for vertically delivering the articles and the second delivery device for laterally delivering the articles.

2. A sorting device according to claim 1, wherein the first delivery device is designed as a drop flap with at least one flap that can be rotated about a horizontal axis for vertically ejecting the articles to the delivery point, wherein the at least one flap is pivotable reversibly from a closed position into an open position and, in the closed position, forms the bearing surface of the transport platform.

3. A sorting device according to claim 1, wherein the second delivery device is designed as a slider for laterally expelling the articles to the second delivery point.

4. A sorting device according to claim 3, wherein the slider has a sliding element which is displaceable between a rest position and at least one expulsion position along the bearing surface transversely to the transport direction.

5. A sorting device according to claim 4, wherein the sliding element in its rest position forms a separating web on the bearing surface, which separating web divides said bearing surface into a first and a second bearing area on each side of the separating web.

6. A sorting device according to claim 4, wherein the sliding element is coupled to at least one traction means, provided at an edge of the transport platform for displacement along the bearing surface.

7. A sorting device according to claim 4, wherein the sliding element is coupled to two traction means, provided at opposite edges of the transport platform and driven in parallel for displacement along the bearing surface.

8. A sorting device according to claim 4, wherein the sliding element is coupled to at least one spindle provided at an edge of the transport platform for displacement along the bearing surface.

9. A sorting device according to claim 1, wherein at least one transport platform of a second type has only the first delivery device for vertically delivering the articles and at least one transport platform of a third type has only the second delivery device for laterally delivering the articles.

10. A sorting device according to claim 1, wherein the conveying device has a closed chain of transport platforms which are adjacent to one another and are guided along an essentially circular path.

11. A method of sorting articles at specific respective delivery points with a sorting device according to claim 1, wherein the articles are placed on the transport platforms of the conveying device of the sorting device, the articles are transported on the transport platforms to the delivery points and the articles are delivered from the transport platforms to the respective delivery points characterized in that the articles are assigned at least one parameter characterizing them and the articles are delivered to the respective delivery point optionally laterally or vertically in each case depending on the parameter.

12. A method according to claim 11, wherein the articles are placed on transport platforms of the first type for an optionally lateral or vertical delivery from the respective transport platform to the respective delivery point.

13. A method according to claim 11, wherein the articles are placed on transport platforms of a second type for vertical delivery or on transport platforms of a third type for laterally delivering the articles to the respective delivery point, in each case depending on the parameter.

14. A method according to claim 11, wherein the article is delivered from the transport platforms to the respective delivery point either laterally by being pushed out by means of a slider or vertically by being dropped through a drop flap.

15. A method according to claim 11, wherein che the at least one parameter associated to the respective articles is selected from a fragility, a size, a shape and a weight of the article.

* * * * *